United States Patent [19]

Niemann

[11] 4,285,705

[45] Aug. 25, 1981

[54] APPARATUS FOR INFLUENCING THE BOUNDARY LAYERS AT WALLS

[75] Inventor: Hans-Joachim Niemann, Erlangen, Fed. Rep. of Germany

[73] Assignee: Kraftwerk Union Aktiengesellschaft, Mülheim, Fed. Rep. of Germany

[21] Appl. No.: 18,230

[22] Filed: Mar. 7, 1979

[30] Foreign Application Priority Data

Mar. 10, 1978 [DE] Fed. Rep. of Germany ....... 2810444

[51] Int. Cl.$^3$ .............................................. B01D 51/08
[52] U.S. Cl. ...................................................... 55/277
[58] Field of Search ...................................... 55/17, 277

[56] References Cited

U.S. PATENT DOCUMENTS

| | | | |
|---|---|---|---|
| 3,277,631 | 10/1966 | Sunnen | 55/17 |
| 3,460,318 | 8/1969 | Creutz | 55/17 |
| 3,725,271 | 4/1973 | Giannotti | 55/17 |
| 3,853,528 | 12/1974 | Wodrich et al. | 55/17 |
| 4,135,898 | 1/1979 | Rosengard | 55/17 |

*Primary Examiner*—Robert H. Spitzer
*Assistant Examiner*—E. Rollins Cross
*Attorney, Agent, or Firm*—Herbert L. Lerner

[57] ABSTRACT

Device for influencing boundary layers at walls of flow guidance equipment encasing a fluid flow including means defining collecting channels within the walls for controllably supplying and withdrawing fluid therewith, and means for defining in the walls fine holes connected to the collecting channels.

5 Claims, 13 Drawing Figures

APPARATUS FOR INFLUENCING THE BOUNDARY LAYERS AT WALLS

The invention of the instant application relates to apparatus for influencing or controlling boundary layers at walls, more particularly, of guide members or guidance equipment enclosing or encasing a preferably gaseous flow, such as nozzles, diffusors and the like which are finding use especially for isotope separating methods with selective laser excitation. It was recognized at an early stage that the formation and control or influencing of boundary layers at surfaces contacted by fluid flow are of great importance; note, for example, the book "Grenzschicht-Theorie" (Boundary Layer Theory) by Dr. Hermann Schlichting, published by G. Braun, Karlsruhe, Germany. As is well known, boundary layers are produced at the wall by friction of the fluid such as a gas, for example, and result in an undesired reduction in velocity of the gas, to compression thereof and, thereby, to an adiabatic temperature rise or heating thereof, to a transition of the flow from laminar to turbulent state, to stripping of the gas flow from the wall and, thereby, to a relocation or shifting of the gas path and, in the case of supersonic flows, to compression shocks the instant that the boundary layer attains a given thickness. Those phenomena were discovered in connection with problems of aerodynamics, have been measured in wind tunnels and have been solved or controlled, at least in part, by constructional measures or features. Attention is drawn therein to the construction of slotted wings in aircraft, as well as also to withdrawing or sucking away of the boundary layer, as discussed in Chapter XIV of the hereinaforementioned book. It is apparent therefrom that until now, stress has always been laid on improving the behavior of bodies contacted by a flow, whether for energy reasons or even, for example, for improving aerodynamic properties.

Such considerations are of no significance, however, in conducting fluid, such as gas, flows through enclosing or encasing guidance equipment such as nozzles, diffusors and the like. Such flows are, for example, important constituents of methods for the separation of isotopes with selective laser excitation, of low-temperature spectroscopy as well as also in gas-dynamic lasers. The flows, which often reach supersonic velocities, are therein often conducted through very small nozzles with a gap width that is often less than 1 mm as well as through diffusors with similar apertures. If, in such apparatus, boundary layers are produced at the walls guiding the flow, it is clear that the boundary layers, in view of the small flow cross sections, have an especially great effect upon the main flow and exert an adverse influence thereon, for example, with respect to the velocity or the pressure, so that the gas states or conditions to be produced by these flow devices cannot be attained. These phenomena, however, are no longer comparable to those which are known from aeronautics and have been solved for the most part in that technology.

The problem therefore arose of how to influence or control those boundary layers as may become formed in such small flow guidance equipment of the hereinaforementioned type, in a manner that the goals attempted sought-after or desired for these devices can also actually be achieved. In isotope separation, for example, the objective is to expand the gas mixture by adiabatic expansion in a nozzle to below 100° K., since an isotope-specific excitation with certain defined laser frequencies becomes possible only at these low temperatures. Without influencing or controlling the boundary layer, however, it is hardly possible to go below this temperature threshold to any adequate extent.

It is accordingly an object of the invention to provide an apparatus or device for influencing or controlling boundary layers which will avoid the foregoing disadvantages and accomplish the aforestated objectives.

With the foregoing and other objects in view, there is provided, in accordance with the invention, in guidance equipment encasing the fluid flow or in important wall regions thereof, that fine bores or holes be formed which are connected to collecting channels that are disposed in the interior of the walls and serve for sucking away or feeding-in gas in a controlled manner. In view of the hereinaforedescribed smallness of these devices, however, this disposition of holes and the like encounters extremely great mechanical difficulties. It is therefore proposed, in accordance with the invention, to build up these walls of exactly stacked thin laminations, such as metal sheets of foils, and to provide these laminations with holes forming the collecting channels as well as with slots extending from the holes and to respective edges of the laminations making up the walls. Because of the smallness of these parts, these slots and holes must be made with the greatest possible accuracy, which is possible, for example, by means of conventional photo-etching techniques, such as have already found use heretofore in the fabrication of separation nozzles for uranium enrichment according to Professor Becker. With these techniques it is possible to provide, in a relatively simple manner, virtually any number of small openings in the inner surfaces of the flow-guiding components directed toward the flow and extending through small channels to main channels. Through these main canals, gas can either be introduced into the boundary layer or gas can be sucked away or withdrawn from the boundary layer, which is the more important application. The photo-etching technique mentioned hereinbefore is a proven method for fabricating parts which must be produced in large quantities, but other possibilities, such as the electron beam technique, for example, are also conceivable, by means of which similar extents of accuracy are attainable. Since the flow guiding member, which must be equipped with such devices, are built up by means of the stacking technique, this therefore always involves an extremely large number of absolutely equally dimensional individual parts. In accordance with a concomitant feature of the invention, the slots formed in the stacked laminations extend in such direction as to be covered laterally by laminations respectively adjacent thereto so as to form fine passageways open only at the collecting channels and at the edges of the laminations.

Other features which are considered as characteristic for the invention are set forth in the appended claims.

Although the invention is illustrated and described herein as embodied in apparatus for influencing the boundary layers at walls, it is nevertheless not intended to be limited to details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings, in which.

Figure 1:
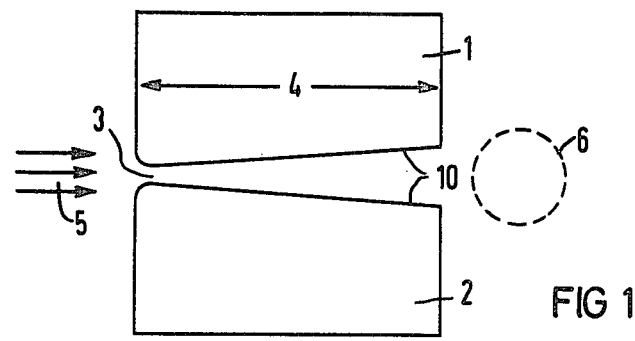
FIG. 1 is a diagrammatic cross-sectional view of a nozzle assembly employed for isotope separation with selective laser excitation in accordance with the prior art.

Referring now to the drawings and first, particularly, to FIG. 1 thereof, there is shown diagrammatically the spatial relationship between an expansion nozzle 1, 2 and a laser beam 6 for isotope-selective excitation of an individual isotope compound contained in a gas jet. This view of FIG. 1 is a cross-section of the nozzle assembly having an upper nozzle body part 1 and a lower nozzle body part 2. Also shown are nozzle gap 3 per se i.e. the narrowest location of the nozzle and the nozzle wall 10 extending toward the discharge opening of the nozzle. A gas mixture 5, for example, of $UF_6$ and a reaction gas, enters the nozzle gap 3 from the left-hand side of FIG. 1, expands adiabatically over the length 4 of the nozzle, is cooled down in the process to below 100° K. and is then traversed by the laser beam 6 (shown in cross section). Such nozzles are normally slit-shaped and have, at the narrowest location 3 thereof, a width of, for example, 0.5 mm and a crosswise dimension of, for example, 50 cm. The length of the nozzle is in the order of magnitude of 20 to 50 mm. Such small dimensions are necessary for the purpose of isotope separation, for example, from $UF_6$, because otherwise appreciable condensation occurs and, thereby, selective excitation of the one isotope compound with subsequent, thereby initiated formation of $UF_5$ or $UF_4$, for example, would be rendered impossible, at least in part. Such dimensions, however, involve the danger that the nozzle may become almost completely clogged or obstructed by a boundary layer, so that the objective of adiabatic expansion, namely, the hereinafore mentioned lowering or reduction of the temperature, can no longer be achieved. Care must therefore be taken that the boundary layers forming at the walls 10 do not become too large which is achieved by the measures or features of the invention of the instant application.

Figure 2:
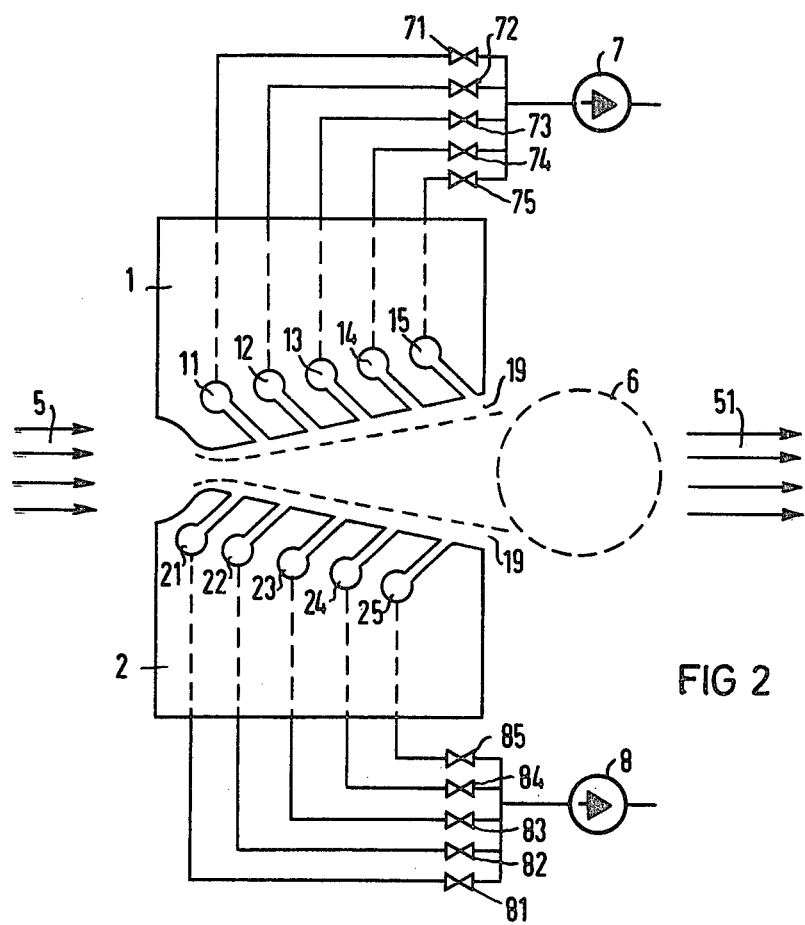
FIG. 2 is a diagrammatic cross-sectional view of an assembly such as that of FIG. 1 incorporating features of the invention of the instant application.

In FIG. 2, these measures or features are shown diagrammatically, as well as the boundary layer 19, which is formed along the nozzle walls 10. For reducing the boundary layer 19, the walls 10 are provided, in accordance with the invention, with a large number of fine holes or bores 16, which form suction draw-off channels terminating in collecting or manifold channels 11 to 15 in the upper part 1 of the nozzle and in collecting or manifold channels 21 to 25 in the lower part 2 of the nozzle, as viewed in FIG. 2. These collecting channels 11 to 15, on the one hand, and 21 to 25, on the other hand, are, in turn, connected to a pump 7 through valves 71 to 75 for the upper nozzle part 1 and to a pump 8 through valves 81 to 85 for the lower nozzle part 2. Through these parts 7 and 8, the boundary layer 19 can then be reduced or drawn-off altogether, the valves 71 to 75 as well as the valves 81 to 85 locally affording a planned or predetermined removal by suction or reduction of the dimension of the boundary layer 19.

In view of the herinafore-mentioned smallness of the nozzle, almost insurmountable difficulties are encountered in the disposition of this gas removal or feed system into the two members 1 and 2, when the latter are formed of solid or massive material. This problem of construction was solved in accordance with the invention by building up the nozzle members 1 and 2 out of suitably shaped laminations in the form of sheets or foils by means of a conventional stacking technique, it being especially advantageous to shape the nozzle channel as well as the channels 16 by means of a photo-etching technique, since such a technique affords the accuracy necessary for the large numbers of sheet or foil laminations that are required. This stacking technique and also the photo-etching are known in the art and have already been used for example, for making separating nozzles (according to Prof. Becker), such separating nozzles being employed in a method of isotope separation or uranium enrichment, other than the method which employs a laser.

Figure 3:
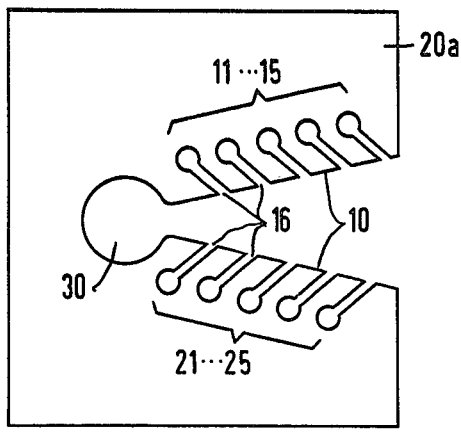
FIGS. 3 and 4 are plan views of two different individual foils which, when stacked one upon the other with a multiplicity of layers, form the body of the nozzle of FIG. 2.
Figure 4:
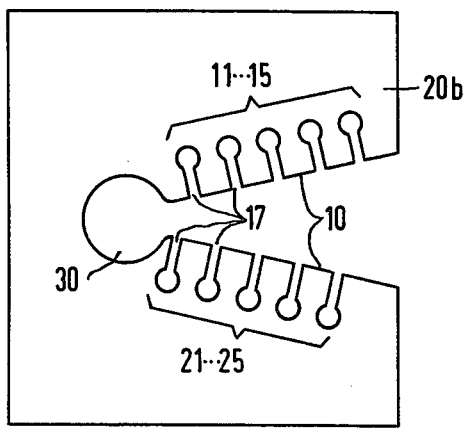

FIGS. 3 and 4 show the construction of individual foils 20a and 20b which, when stacked together, form a nozzle body. The large hole or bore 30 forms the feed channel for the gas mixture 5 supplied to the nozzle, and the smaller holes 11 to 15 as well as 21 to 25, when the foils 20a and 20b are stacked together, form the corresponding collecting channels which were discussed hereinbefore with respect to FIG. 2. According to FIG. 3, slots 16 extend from these small holes 11 to 15 and 20 to 25 to the edge of the nozzle-outlining 10 of the respective foil and, in FIG. 4, slots 17 extend to the edge 10, although at a different angle thereto than in FIG. 3. These slots 16 and 17 form the suction channels, since they are covered laterally by the adjacent foils, and the edge 10 of the stacked-up sheets 20a and 20b forms the nozzle wall of the outlet channel.

Figure 5:
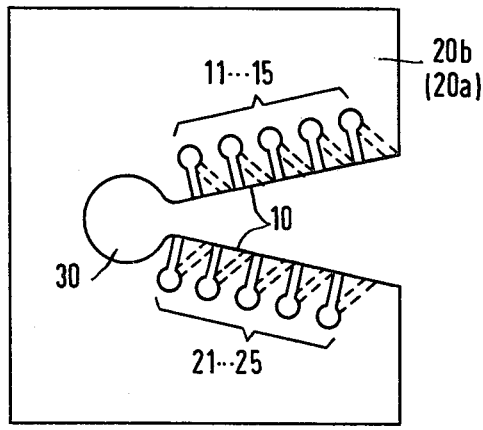
FIG. 5 is a diagrammatic plan view of the foils of FIGS. 3 and 4 mutually superimposed.

FIG. 5 illustrates the position of the channels 16 and 17 when the foils 20a and 20b are stacked upon one another. These channels 16 and 17 then terminate in the same collecting channels 11 to 15 and 21 to 25.

Figure 6:
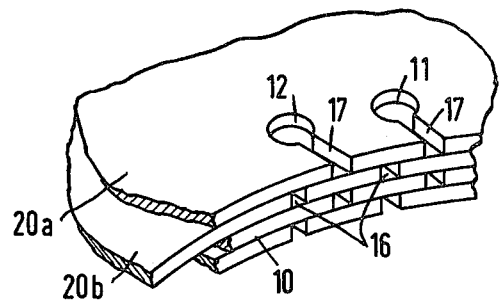
FIG. 6 is a perspective view, partly broken away and in section of four layers which include pairs of the foils of FIGS. 3 and 4.

A perspective side view of the nozzle wall 10 is shown in FIG. 6, from which it can be seen that the slots 16 and 17 open into the surface of the nozzle wall 10 as fine channels. It is also possible, of course, in order to control or influence the distribution of the eventual bores or holes 16 and 17, to interpose foils formed without any of these slots 16 and 17, but which, however, are formed only with the holes 30 as well as the holes 11 to 15 and 21 to 25.

Figure 7:
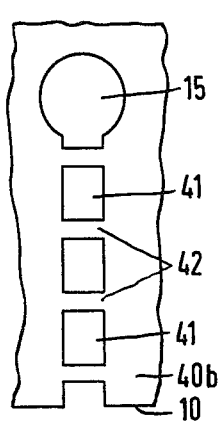
FIGS. 7, 8 and 9 are fragmentary plan views of different individual embodiments of the foils.
Figure 8:
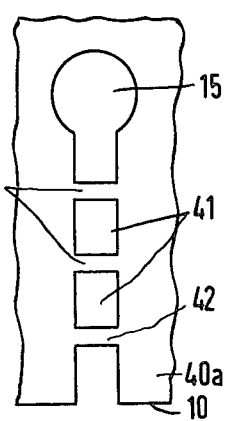
Figure 9:
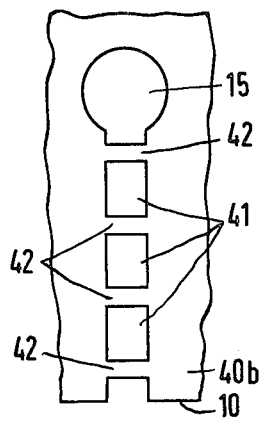
Figure 10:
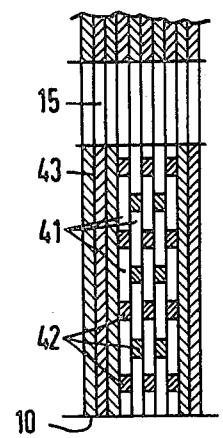
FIG. 10 is a fragmentary cross-sectional view of a multiplicity of the foils of FIGS. 7, 8 and 9 that are mutually stacked.

The solution according to the invention for disposing the suction canals 16 and 17 and the like, shown exemplified in FIGS. 3, 4 and 5, however, runs into difficulties if a relatively large density or concentration of suction openings is required on the nozzle walls 10. The foil strips remaining between the slots 16 and 17, respectively, are then also rather thin and narrow, so that problems may arise when these foils are stacked together. This difficulty is circumvented in the construction of the foils 40a and 40b according to the invention, shown in FIGS. 7 to 10. In the embodiments of FIGS. 7 to 10, only the respective slot 41 starting from one channel bore or hole 15 up to the nozzle wall 10, is shown. However, this slot 41 is not continuous in each of the foils 40a and 40b but is bridged by bars or crosspieces 42 of material which remain. As shown in FIGS. 7 and 8, these bridges or crosspieces 42 are, however, disposed in offset relationships to one another when the foils 40a and 40b are stacked (note FIG. 9), so that a sinuous suction path is formed as shown in FIG. 10, which represents a cross-sectional view of the stack of FIG. 9. By means of the bars or cross-pieces 42, bridging the slots 41, however, a trouble-free mechanical interrelationship or association of the individual surface parts of the foils is preserved, so that stacking thereof without difficulty is possible. In FIG. 10, it is also shown that this stack can additionally include other foils 43 which are formed only with the bore or hole 15 for providing the collecting channels and, of course, also with the feed hole 30 (FIGS. 3 to 5) for the gas mixture.

Figure 11:
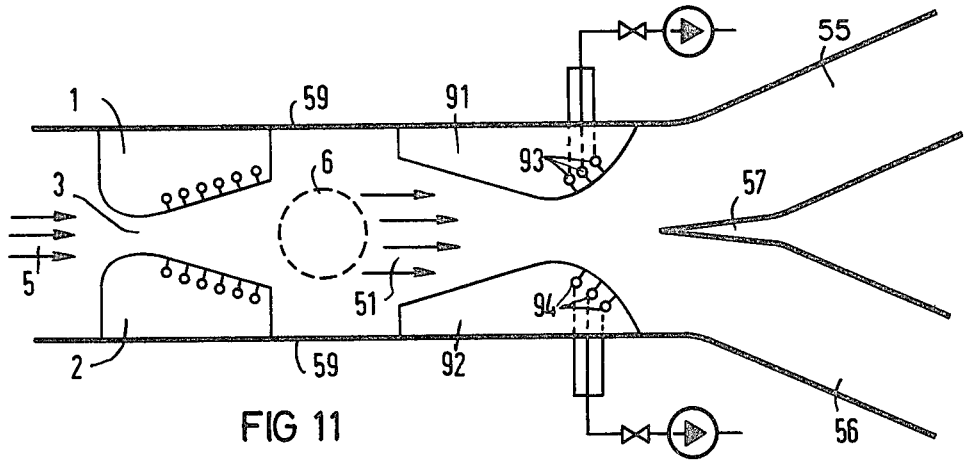
FIG. 11 is a diagrammatic view incorporating the assembly of FIG. 2 of a uranium isotope separation installation.

Influencing or controlling the boundary layers can, of course, be advantageous and necessary, not only in nozzles, but also in other apparatus such as are provided for conducting preferably gaseous flows, such as diffusors. In this regard, also, reference will be made to an example from the technology or art of uranium isotope separation. FIG. 11 shows, as it were, as an extension or expansion of the apparatus of FIG. 2, a schematic diagram of the flow path in such an apparatus or installation. The gas mixture 5 enters the nozzle gap 3, is adiabatically expanded in the nozzle 1, 2 and is excited isotope-specifically by means of the laser beam 6 and converted into the excited compound. This flow 51 containing the enriched isotope, then enters into a diffusor formed of the parts 91 and 92 and is subsequently deflected into the channel sections 55 and 56. These channel sections 55 and 56 are formed by the wedge-shaped edge 57 disposed in the flow channel 59.

Figure 12:
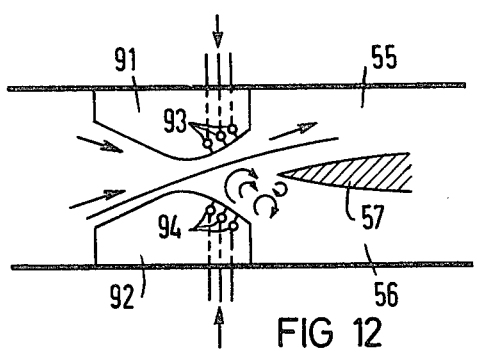
FIGS. 12 and 13 are reduced fragmentary views of FIG. 11 showing diagrammatically different operating modes thereof.

As shown, the diffusor 91, 92 is provided also with the devices according to the invention which affords a sought-after influencing or control of the boundary layers by means of valves and pumps. Thus, it is possible, for example, to suck off or withdraw the boundary layer by means of collecting channels 93, and to introduce a supplemental gas through channels 94 and thereby strip off the boundary layer. The consequence of this measure is shown in FIG. 12. The flow 51 is deflected by the turbulent layer downstream of the diffuser part 92 in direction of the flow 51 and is conducted farther by the channel 55. By changing the pressure conditions, the flow 51 can then be conducted off into the channel 56.

Figure 13:
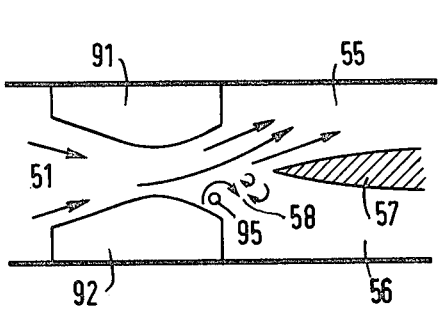

In FIG. 13, the same flow behavior is shown as in FIG. 12, except that the eddies 58 deflecting the flow 51 are not generated by blowing supplemental gas into the path thereof as in FIG. 12 but by locally heating the gas flow 51, for example, by means of a high-energy laser beam 95 or by locally heating the diffuser wall of the part 92 at this location. Through such an abrupt heating, the boundary layer is likewise stripped off, a turbulent zone 58 is formed and the gas flow 51 is deflected in the indicated manner. This type of deflection can, of course, also be combined with that shown in FIG. 12.

The technical significance of these measures may be briefly explained as follows. The problem of deflecting a gas flow arises, for example, if the gas jet is irradiated by pulsed lasers and the isotope-selective excitation of only the one isotope compound is effected, therefore, only in that part of the gas jet which was exposed to the radiation. Thus, for example, for a laser beam diameter of 5 mm and a flow velocity of the gas of 500 m/sec, the lingering period is 10 $\mu$sec. The pulse time or pulse period of the laser, however, is, for example, between 10 nanosec and 1 $\mu$sec. This means that not more than 5 mm of the length of the gas jet are exposed. The next laser pulse occurs at best after 2 msec (assumed pulse frequency of 500 Hz). During this time period, however, the jet of the gas mixture has travelled 100 cm without being influenced or controlled or exposed.

The isotope (for example, 235 $UF_6$) excited during the pulse time or pulse period of the laser is separated chemically and physically in a conventional manner, thus, for example, converted into a solid. If the irradiated phase of the gas flow is not separated, however, from the nonirradiated and therefore unchanged phase, mixing occurs which results in an extremely great degradation of the enrichment action. Such degradation, however, has an enormous effect upon the costs of the so-called "separation work unit."

If it is now possible, however, to separate the exposed excited part of the flow by controlled spatial deflection (note FIGS. 11 to 13) from the non-exposed part of the gas flow, the separation effect obtained by the laser beam 6 is preserved, so that the full efficiency of this method is retained inspite of the pulsed operating mode of the laser equipment.

The switching times that can be deduced from the just-mentioned example require a high switching speed of the valves which, of course, depends, in addition, upon the flow resistance and the length of the suction channels 93. The valves additionally require a spatial construction since they must not only operate at this switching speed but also should be capable of switching from underpressure to overpressure, so that the flow deflection can swing or oscillate between the channels 55 and 56.

The particular constructional possibility, according to the invention, for rapidly displacing or shifting the gas jet by means of a laser 95, as shown in FIG. 13 works without any moving mechanical parts and can therefore be controlled more exactly. The laser frequency, in this regard, is of secondary importance, the laser power for directly heating the boundary layer flow can be supplied, for example, by a $CO_2$-laser without difficulty. The sudden or abrupt heating attained thereby results in a pressure increase and, thereby, a stripping of the boundary layer from the wall, as mentioned hereinbefore. Also, direct radiant heating of the wall of the diffuser 91, 92 by means of such laser (especially if the diffuser wall is advantageously dyed black at this location), yields the same effect even with considerably lower laser power.

In this manner, switching times or periods in the msec-range can be realized and thus afford an effective separation of the exposed or irradiated flow 51 from the non-exposed or non-irradiated flow.

The influencing or control of the boundary layers of guiding equipment encasing a gaseous flow therefore results not only in that the theoretically calculated and desired flow conditions are able to be attained in a practical manner but also, flow deflections are realizable very rapidly without mechanically moved parts obtained and, thereby, the effect achieved by the treatment of such flows is preserved, uninfluenced as much as possible, for the respective further control of the process.

It should furthermore be noted that the influencing or control of the boundary layers proposed by the invention of the instant application is suitable not only for adiabatic expansion of gases in the course of the separation of uranium isotopes, but also, as mentioned briefly hereinbefore at the introduction of this application, for other processes wherein gas flows must be conducted in flow guiding devices of spatially or physically similar dimensions.

There are claimed:

1. Device for influencing boundary layers at walls of flow guidance equipment encasing a fluid flow comprising means defining collecting channels within the walls for controllably supplying and withdrawing fluid therewith, and means for defining in the walls fine holes connected to said collecting channels.

2. Device according to claim 1 wherein the walls are made up of exactly stacked thin laminations having holes therein forming said collecting channels and having slots therein extending from said holes to respective edges of said laminations making up the walls.

3. Device according to claim 2 wherein said slots formed in said stacked laminations extend in such direction as to be covered laterally by laminations respectively adjacent thereto so as to form fine passageways open only at said collecting channels and at said edges of said laminations.

4. Device according to claim 1, wherein each of said collecting channels has substantially the same size and shape, and each of said means defining fine holes are slots having substantially the same size and shape, each one of said slots being connected to one of said collecting channels.

5. Device according to claim 2, wherein said slots formed in any given lamination extend at a different angle than said slots formed in each adjacent lamination leading to the same collecting channel.

* * * * *